(12) United States Patent
Seegel et al.

(10) Patent No.: US 11,407,490 B2
(45) Date of Patent: Aug. 9, 2022

(54) AIRCRAFT STRUCTURAL COMPONENT WITH AIRCRAFT SKELETON COMPONENT AND FLUID CONDUIT COMPONENT

(71) Applicant: Airbus Operations GmbH, Hamburg (DE)

(72) Inventors: Hauke Seegel, Hamburg (DE); Sven Karras, Hamburg (DE); Anja Haeberle, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 191 days.

(21) Appl. No.: 16/790,136

(22) Filed: Feb. 13, 2020

(65) Prior Publication Data
US 2020/0298954 A1   Sep. 24, 2020

(30) Foreign Application Priority Data
Feb. 18, 2019   (DE) .......................... 102019104000.0

(51) Int. Cl.
| | |
|---|---|
| *B64C 3/34* | (2006.01) |
| *B64D 37/02* | (2006.01) |
| *B64C 3/18* | (2006.01) |
| *F16L 3/00* | (2006.01) |

(Continued)

(52) U.S. Cl.
CPC ................ *B64C 3/182* (2013.01); *B64C 1/06* (2013.01); *B64C 1/061* (2013.01); *B64C 3/34* (2013.01); *B64D 37/02* (2013.01); *F16L 3/00* (2013.01); *F16L 55/07* (2013.01)

(58) Field of Classification Search
CPC ......... B64C 3/182; B64C 1/064; B64C 1/061; B64C 3/185; B64C 3/34; B64D 37/16; B64D 37/14; F16L 55/07
See application file for complete search history.

(56) References Cited

U.S. PATENT DOCUMENTS

| | | | | |
|---|---|---|---|---|
| 2,460,368 | A | * | 2/1949 | Snow ...................... B64D 37/04 220/651 |
| 6,698,692 | B1 | * | 3/2004 | Tichenor ................ B64D 37/24 244/135 R |

(Continued)

FOREIGN PATENT DOCUMENTS

| | | | | | |
|---|---|---|---|---|---|
| EP | E P-2551200 | A2 | * | 1/2013 | ........... B64D 37/005 |
| GB | 2501733 | A | * | 11/2013 | ............. B64D 37/32 |
| GB | 2544306 | A | * | 5/2017 | ............. B64D 37/10 |

OTHER PUBLICATIONS

German Search Report; priority document.

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

An aircraft structural component is described, including an aircraft skeleton component which divides a space along a longitudinal axis of the aircraft skeleton component into two spatial portions arranged on opposite sides of the aircraft skeleton component, and including a fluid conduit component which runs on an outer side of the aircraft skeleton component and fluidically connects the two spatial portions. Also described is an aircraft wing with an aircraft structural component, as well as an aircraft with an aircraft structural component or with an aircraft wing.

14 Claims, 2 Drawing Sheets

(51) Int. Cl.
*F16L 55/07* (2006.01)
*B64C 1/06* (2006.01)

(56) References Cited

U.S. PATENT DOCUMENTS

| | | | |
|---|---|---|---|
| 2012/0273619 A1* | 11/2012 | Tichborne | B64D 37/16 244/135 A |
| 2013/0161342 A1* | 6/2013 | Wong | B64D 37/32 220/750 |
| 2013/0316147 A1* | 11/2013 | Douglas | B29D 99/0003 428/172 |
| 2015/0047716 A1* | 2/2015 | Muir | F16K 31/26 137/202 |
| 2015/0096984 A1 | 4/2015 | Ashton et al. | |
| 2017/0217603 A1 | 8/2017 | Cabral et al. | |
| 2018/0370649 A1 | 12/2018 | Wood | |

\* cited by examiner

AIRCRAFT STRUCTURAL COMPONENT WITH AIRCRAFT SKELETON COMPONENT AND FLUID CONDUIT COMPONENT

CROSS-REFERENCES TO RELATED APPLICATIONS

This application claims the benefit of the German patent application No. 102019104000.0 filed on Feb. 18, 2019, the entire disclosures of which are incorporated herein by way of reference.

FIELD OF THE INVENTION

The invention relates to an aircraft structural component with an aircraft skeleton component and with a fluid conduit component. In particular, the invention relates to an aircraft structural component with an aircraft skeleton component and with a fluid conduit component, which runs on an outer side of the aircraft skeleton component and fluidically connects two portions separated by the aircraft skeleton component.

BACKGROUND OF THE INVENTION

Frames and stringers are fastened to the inner sides of the tank walls of an aircraft wing. These frames and stringers create recesses, which allow air pockets to form, in particular on a top side of the tank, when the tank is filled with fuel. These air pockets are undesired, since they reduce the capacity of the tank and also slow down the filling operation. Therefore, it is desirable for the air to be able to quickly flow out of the pockets.

To date, this has been achieved by the stringers, in particular, being drilled through, in order to allow air to escape from the recesses as far as the highest point in the tank. In the case of such stringers being produced from an otherwise lightweight material, such as carbon fiber-reinforced plastic, the fibers exposed by the drilling have to be sealed with respect to the fuel. Moreover, the stringers have to be produced more stably and thus solidly, in order to have the same stability after the drilling as without drilling. Consequently, the production takes a long time and adds weight to the tank.

SUMMARY OF THE INVENTION

The invention is based on the object of providing a lightweight and cost-effective aircraft structural component which makes it possible for a tank to be filled quickly and completely.

According to one aspect, for better understanding of the present disclosure, an aircraft structural component comprises an aircraft skeleton component, which divides a space along a longitudinal axis of the aircraft skeleton component into two portions arranged on opposite sides of the aircraft skeleton component, and comprises a fluid conduit component, which runs on an outer side of the aircraft skeleton component and fluidically connects the two spatial portions. Since the aircraft structural component may comprise a plurality of components, reference may also be made to an aircraft structural arrangement.

Such a fluid conduit component makes it possible for a fluid to flow from one side of the fluid conduit component to an opposite side. By way of example, as a result, a gas, such as, for example, air, can flow from one side of the aircraft skeleton component to another side of the aircraft skeleton component (as seen in the longitudinal direction of the aircraft skeleton component). By way of the fluid conduit component, drilled holes in the aircraft skeleton component can be dispensed with. Consequently, the aircraft skeleton component can be produced thinner and therefore with less mass. Moreover, the otherwise laborious step of drilling, and possibly also the sealing of the cut edges of the drilled hole, is omitted.

In one refinement variant, the fluid conduit component is a hose. By way of example, a hose of a flexible material may be used for this purpose. As an alternative, a rigid conduit may also be used as a fluid conduit component. It goes without saying that any desired combination of one or more hoses and one or more rigid conduits may also be used.

A standard component may be used (in each case) as the hose and/or conduit, as a result of which the aircraft structural component can be produced cost-effectively. Thus, it is possible to use customary hoses and plastic conduits of fuel-resistant (in particular kerosene-resistant) materials, such as for example silicone or technical polymers, preferably polytetrafluoroethylene (PTFE), polyether imide (PEI), polyamide (PA) or polyoxymethylene (POM), or blends thereof, or else metals, such as, for example, aluminum.

The fluid conduit component, both in the form of a hose and in the form of a rigid conduit, may also comprise angle elements and/or other connecting elements. Consequently, the fluid conduit component can be assembled in a simple manner in accordance with the modular principle. The angle elements and/or other connecting elements may also be designed as fastening elements and serve for the arrangement of the fluid conduit component along the outer side of the aircraft skeleton component.

The production of a flexible hose or of a rigid conduit itself can also take place in a cost-effective and simple manner, for example by injection molding a thermoplastic elastomer. In this case, the hose or the conduit may be formed such that it adopts the form corresponding to the outer wall of the aircraft skeleton component. By way of example, the hose or the conduit may be produced by means of gas/water injection technology (GIT/WIT).

In a further refinement variant, the fluid conduit component may have a closed form in cross section. This cross-sectional form may be circular, elliptical or rectangular. It is also conceivable that the form initially has an open cross section, for example a U-shaped or Ω-shaped (omega-shaped) cross section. In order to obtain a complete fluid conduit component, that is to say, a closed cross section for conducting a fluid, the cross section of the open fluid conduit component may be closed by attachment to the aircraft skeleton component.

As an alternative or in addition, the cross section of the open fluid conduit component may take place by attachment to a further component with an open cross section. By way of example, two symmetrical (when viewed in cross section) components may be fastened to one another in order to create a closed cross section. In this case, in a prefabrication step, a component may already be fastened to the aircraft skeleton component.

In any event, the fluid conduit component is open at its two ends in the longitudinal direction, in order to make it possible for the fluid for flowing through the fluid conduit component to flow in or out.

In a further refinement variant, the aircraft skeleton component is a stringer or a frame. Stringers and frames serve as a stiffening component or shaping component of a hull. The hull can be any desired wall of an aircraft. The most usual wall is the outer skin of the aircraft. However, stringers and frames can also be provided on components arranged in the interior of the aircraft, for example a rear final wall of the pressurized portion of the aircraft, or of the tank arranged in the interior of the aircraft.

In a further refinement variant, the fluid conduit component is fastened to the aircraft skeleton component. In particular, the fluid conduit component is fastened to the outer side of the aircraft skeleton component. The outer side of the aircraft skeleton component is understood here to be, in particular, the arrangement and fastening of the fluid conduit component outside of a space enclosed or taken up by the aircraft skeleton component. In other words, the fluid conduit component does not run through the aircraft skeleton component, for which openings or drilled holes would be necessary.

The fluid conduit component may be fastened by clamping, adhesive bonding, welding, screwing or the like. The fluid conduit component may also be fastened to another object in the surrounding area of the aircraft skeleton component. By way of example, the fluid conduit component may be attached to a wall or hull on opposite sides of the aircraft skeleton component, which is likewise fastened to the wall or hull. It is thus not necessary for the fluid conduit component and the aircraft skeleton component to be in contact.

In yet a further refinement variant, the fluid conduit component is arranged relative to the aircraft skeleton component such that the ends of the fluid conduit component lie where the fluid pocket will occur on account of the aircraft skeleton component. By way of example, the aircraft skeleton component may be arranged in the space such that, on account of gravity, a fluid cannot flow past the aircraft skeleton component, but is prevented from doing so thereby. If the fluid conduit component is thus arranged relative to the aircraft skeleton component such that the ends of the aircraft skeleton component are located where fluid collects on account of gravity, the fluid can still flow through the fluid conduit component and, in particular, can flow around the aircraft skeleton component. Under collection of fluid on account of gravity, attention is focused not only on liquids that collect in a depression but, in particular, also on gases that flow upward counter to the gravitational force.

According to a further refinement variant, the aircraft structural component also comprises a wall or hull of an aircraft tank, wherein the aircraft skeleton component is arranged on and fastened to an inner side of the wall or hull. The inner side of the wall is understood here to be the side facing toward the interior of the aircraft tank. The wall or hull forms with the aircraft skeleton component at least one recess, since the aircraft skeleton component divides the space delimited by the wall or hull along the longitudinal axis of the aircraft skeleton component into at least one portion (usually two portions arranged on opposite sides of the aircraft skeleton component). When the aircraft tank is being filled, an air pocket (or other gas pocket) may thus occur at such a recess when the level of the fuel or of another liquid in the tank reaches a height of the aircraft skeleton component in the aircraft tank. By way of example, a portion of the aircraft skeleton component projects further into the aircraft tank than another portion, in particular that portion of the aircraft skeleton component which is arranged on the wall or hull. If the fill level of the fuel then rises, this air becomes trapped between the aircraft skeleton component and the wall or hull. If the trapped air cannot escape, the overall capacity of the tank is reduced or an increased pressure is necessary in order to fill in more fuel. The fluid conduit component arranged on the aircraft skeleton component makes it possible for the trapped air (gas) to escape by simple means, and, in particular, without modifying the aircraft skeleton component. It goes without saying that the fluid conduit component should run past on that side of the aircraft skeleton component which faces away from the wall/hull, in order to avoid an opening or drilled hole in the aircraft skeleton component.

In this case, the ends of the fluid conduit component are to be arranged such that the trapped air can escape completely. In other words, that end of the fluid conduit component which is arranged in the recess is to be provided at a point relative to the aircraft skeleton component which, for the escape of air, represents the highest point in the installed state of the aircraft skeleton component or the highest point in the operating state of the aircraft structural component.

The wall or hull may also be part of the outer skin of an aircraft. As an alternative, it is also possible that the wall or hull represents a second, inner layer within the outer skin of the aircraft. According to a further embodiment variant, the wall or hull delimits a tank space of the aircraft tank. By way of example, this may be the outer skin of a wing of the aircraft, wherein the aircraft tank is provided in the interior of the wing.

In a further refinement variant, the aircraft skeleton component is arranged in a space at which condensed water or other liquids regularly collect and the aircraft skeleton component prevents, or at least hinders, these liquids from flowing away. Here, too, the arrangement of a fluid conduit component can make it possible for the liquid (for example condensed water) to flow away as a result of gravity. For this purpose, the ends of the fluid conduit component are arranged in corresponding recesses on opposite sides of the aircraft skeleton component.

According to a further embodiment variant, the fluid conduit component comprises a semipermeable membrane or a valve at at least one end, wherein the membrane or the valve makes it possible for air to flow through and prevents a liquid, in particular fuel, from flowing through into the fluid conduit component. This makes it possible to remove air pockets or other fluid pockets from the respective recess (spatial portion divided by the aircraft skeleton component) until the liquid (in particular the fuel) reaches the end of the fluid conduit component. When liquid is prevented from penetrating into the fluid conduit component, the flow of air through the fluid conduit component is improved. For the case in which liquid has penetrated into the fluid conduit component, the liquid could represent a resistance to the air trapped in the recess that cannot be overcome, on account of a capillary effect and/or the surface tension of the liquid within the fluid conduit component. The same applies to a depression within the fluid conduit component, in which accumulated liquid cannot be displaced by air escaping from the recess. Consequently, the arrangement of a semipermeable membrane or of a valve improves the escape of the air from the recess.

In a further refinement, such a membrane or valve may be located at each end of the fluid conduit component. As a result, a penetration of liquid into the fluid conduit component is prevented even if both ends of the fluid conduit component are covered by liquid.

A film of synthetic high polymer, for example polyurethane (PU) or polytetrafluoroethylene (PTFE), or blends thereof, may serve as a semipermeable membrane. A refinement of the membrane, such that liquid that wets the membrane flows away easily, also makes it possible to quickly open the membrane and consequently for gas (air) to quickly flow through again to the full extent.

A valve may be formed as a float valve, a safety valve or the like. A valve may make it possible for fluid to flow out of the fluid conduit component, whereas the penetration of a liquid into the fluid conduit component is prevented.

In a further embodiment variant, the fluid conduit component may also comprise a safety valve which is configured to let liquids out of the fluid conduit component and is also configured to prevent a liquid from penetrating into the fluid conduit component. This safety valve may be arranged in a middle portion of the fluid conduit component. This safety valve may be provided instead of or together with the above-described at least one membrane or valve located at the end of the fluid conduit component. Any position between the ends of the fluid conduit component may serve as the middle portion of the fluid conduit component. A safety valve serves for the flowing away of liquid that has penetrated into the fluid conduit component, in particular, in the case of a fluid conduit component without a membrane or valve at the ends.

The safety valve may also be provided at that position in the fluid conduit component which represents the deepest point in the installed state of the fluid conduit component or operating state of the aircraft structural component or forms the portion in which liquid collects within the fluid conduit component on account of gravity. In this way, liquid that has entered the fluid conduit component (in spite of a membrane/valve at the ends) can flow away completely through the safety valve.

According to a further embodiment variant, the aircraft skeleton component may be manufactured from carbon fiber-reinforced plastic. This plastic is particularly lightweight and nevertheless offers high stability for the aircraft skeleton component. It goes without saying that the aircraft skeleton component may also be produced from other materials, such as, for example, aluminum or another metal.

In a further embodiment variant, the aircraft structural component may form a part of an aircraft wing. By way of example, an aircraft tank may be integrated in an aircraft wing which has such an aircraft structural component at least in one portion. This tank in the wing may be implemented in the form of a so-called "wet wing". In this form, the outer skin of the wing is entirely sealed and a further wall or chamber is not necessary in order to store the fuel in the wing. In this case, the aircraft structural component forms a part of the sealed outer skin of the wing.

As an alternative, the aircraft structural component may also be provided in the fuselage of an aircraft. By way of example, it may be a portion of a tank within the aircraft fuselage.

According to a further aspect, an aircraft wing comprises an aircraft structural component according to the above aspect or to one of its variants.

In a further aspect, an aircraft comprises an aircraft structural component of the first aspect (or of one of its variants). The aircraft may alternatively or additionally comprise an aircraft wing according to the second aspect.

In one refinement variant, the aircraft comprises an aircraft structural component comprising a wall or hull of an aircraft tank, wherein the wall or hull is a part of an outer skin of the aircraft. By way of example, the wall or hull may be a part of an outer skin of a wing and delimit an aircraft tank.

It goes without saying that the above-described aspects, refinements and variants can be combined, without this being explicitly described. The present disclosure is consequently not limited to the individual refinements and refinement variants in the sequence described, or to a particular combination of the aspects and refinement variants.

BRIEF DESCRIPTION OF THE DRAWINGS

A preferred embodiment of the invention will now be explained in more detail with reference to the appended schematic drawing, in which FIG. 1 schematically shows an aircraft structural component with a wall or hull.

DETAILED DESCRIPTION OF THE PREFERRED EMBODIMENTS

In the present disclosure, terms such as "above" and "below" are used in the operating state of the aircraft structural component. In particular, attention is focused here on gravity, such that "below" specifies the direction in which a liquid flows on account of gravity.

Figure 1:
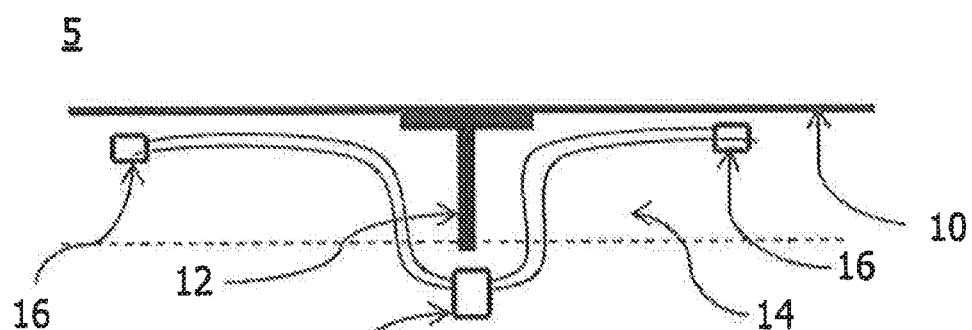

FIG. 1 schematically shows a first aircraft structural component 5 with a wall or hull 10. The aircraft structural component 5 also comprises an aircraft skeleton component 12 and a fluid conduit component 14.

The aircraft skeleton component 12, which is T-shaped in this refinement, divides a space along a longitudinal axis (perpendicular to the plane of the drawing in FIG. 1) of the aircraft skeleton component 12 into two portions arranged on opposite sides of the aircraft skeleton component 12. Together with the wall or hull 10, in this case the space is divided such that a recess is formed on each side of the aircraft skeleton component 12 (on the left and right in FIG. 1). Air can become trapped in this recess when a level of liquid, such as, e.g., fuel, rises from below and wets the bottom end of the aircraft skeleton component 12 (such a level of liquid is illustrated by way of example by a dashed line in FIG. 1). The air, for example, can no longer flow from one side of the aircraft skeleton component 12 to a spatial portion on the opposite side.

The aircraft structural component 5 illustrated in FIG. 1 is indeed illustrated such that the wall or hull 10 is arranged horizontally. It goes without saying that the wall or hull 10 may also run obliquely, such that air trapped in a recess moves (has a tendency to move) obliquely upwardly along the wall, until, at an aircraft skeleton component 12, it can flow no further.

The fluid conduit component 14 thus makes a fluidic connection possible between the two spatial portions separated by the aircraft skeleton component 12. As a result, trapped air can flow out of a recess (spatial portion) into an adjacent recess. The aircraft structural component 5 may have a multiplicity of aircraft skeleton components 12 (only one of which is shown in FIG. 1) along the wall or hull 10. In this way, a plurality of recesses in parallel or in series may result and be fluidically connected to one another by respective fluid conduit components 14. When at least one of the mutually connected recesses has a connection to the surrounding area of the aircraft, e.g., through an outlet valve, the air can escape from all recesses. A multiplicity of fluid conduit components 14 may also be provided in the longitudinal direction of the aircraft skeleton component 12 (perpendicular to the plane of the drawing in FIG. 1).

A semipermeable membrane or valves 16 is located at at least one end of the fluid conduit component 14. In the middle portion of the fluid conduit component 14, a safety valve 18 may be provided. Both the semipermeable membrane or valve 16 and the safety valve 18 prevent liquid from penetrating into the fluid conduit component 14. The ends of the fluid conduit component 14 are elevated in contrast to the middle portion of the fluid conduit component 14 located in that region of the aircraft skeleton component 12 which projects furthest into the interior space of the aircraft structural component 5. As a result, it can be ensured that the fluidic connection between the recesses persists even when the middle portion of the fluid conduit component 14 is already immersed in a liquid, such as, e.g., fuel. The safety valve 18 may also be located at the deepest point of the fluid conduit component 14. As a result, it can be ensured that the liquid as a whole which could have accumulated in the fluid conduit component 14 can flow away.

The portions of the fluid conduit component 14 on the two sides of the aircraft skeleton component 12 may also be of different lengths. By way of example, one portion may be longer, such that the end thereof is further removed from the aircraft skeleton component 12 than the end of the opposite portion of the fluid conduit component 14. In particular in the case of an obliquely arranged wall or hull 10, it can be achieved thereby that the two ends of the fluid conduit component 14 are wetted by the liquid (almost) at the same time when the level of liquid is rising. Consequently, all of the air (gas) can escape out of the recess at the shorter portion through the fluid conduit component 14 into the opposite recess (toward the longer portion), before liquid penetrates into the fluid conduit component 14 (no matter at which end).

Figure 2:
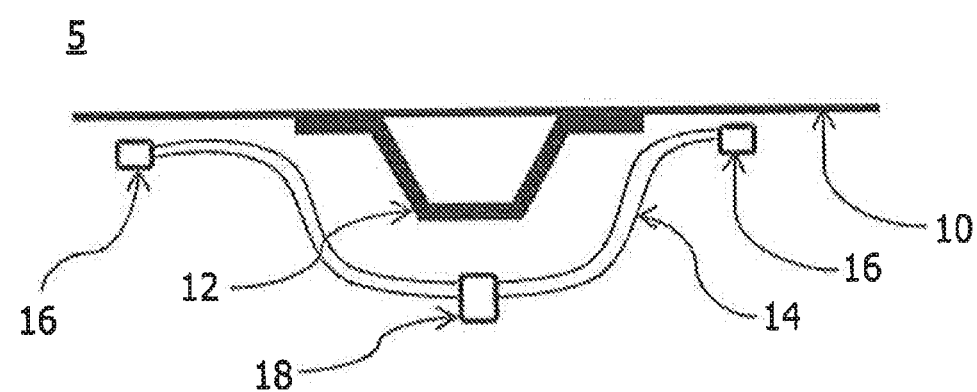
FIG. 2 schematically shows a further aircraft structural component with a wall or hull.

FIG. 2 schematically illustrates an aircraft structural component 5 which is quite similar to that in FIG. 1. Here, however, the aircraft skeleton component 12 is not T-shaped but omega-shaped. Here, too, the fluid conduit component 14 runs on an outer side of the aircraft skeleton component 12. The outer side of the aircraft skeleton component 12 is that side of the aircraft skeleton component 12 which faces away from the wall or hull 10. All other components of the aircraft structural component 5 correspond to those from FIG. 1 and are therefore not described again here.

Figure 3:
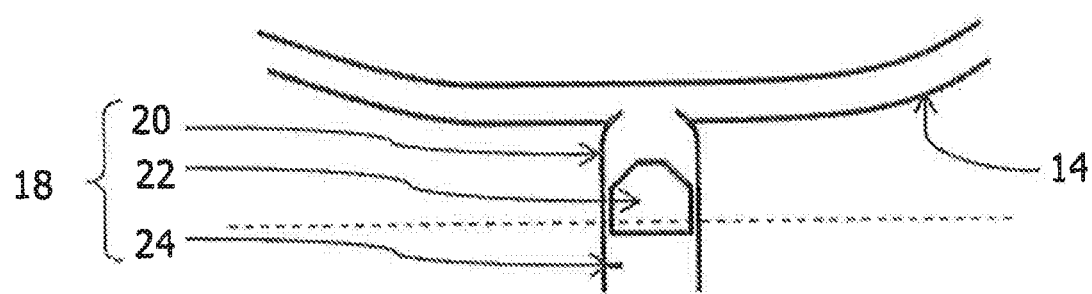
FIG. 3 schematically shows a safety valve in a portion of a fluid conduit component.

FIG. 3 schematically shows an embodiment of the safety valve 18 in the middle portion of the fluid conduit component 14. The safety valve 18 comprises a housing 20, a float 22 and a stop bar 24. The housing 20 has two openings. The top opening may be closed in a fluid-tight manner by the float 22. This float 22 is configured to float on the surface of the liquid. By way of example, the float 22 may be produced from a material or comprise a cavity such that the float 22 floats on the corresponding liquid. The surface of the liquid is represented here by the dashed line. When the surface of the liquid is below the stop bar 24, the float 22 is prevented from falling out by the stop bar 24. When the surface of the liquid reaches or goes above the safety valve 18, or even above the fluid conduit component 14, the liquid is prevented from penetrating into the fluid conduit component 14 by virtue of the fact that the float 22 fluidically seals the upper opening of the housing 20.

Figure 4:
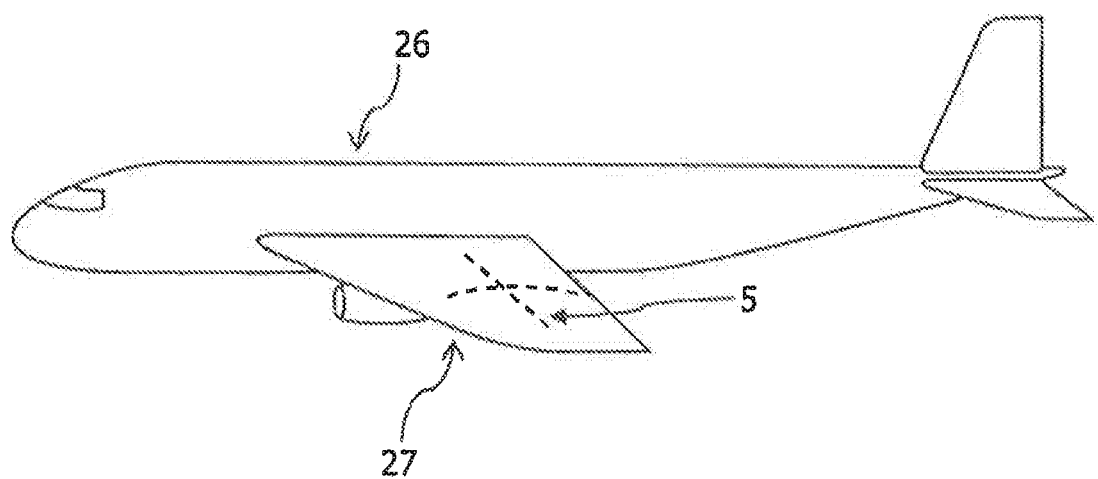
FIG. 4 schematically shows a vehicle with an aircraft structural component.

FIG. 4 schematically shows an aircraft 26 with an exemplary aircraft structural component 5 in an aircraft wing 27. Although represented as an aircraft 26, it goes without saying that it can also be another type of vehicle, such as, for example, a ship.

The refinements described in FIGS. 1 to 4 are not intended to limit the present invention. Rather, they merely serve for understanding of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structural component, comprising:
    an aircraft skeleton component which divides a space along a longitudinal axis of the aircraft skeleton component into two spatial portions arranged on opposite sides of the aircraft skeleton component, the aircraft skeleton component having an inner side joined to another portion of the aircraft structural component and an outer side opposite the inner side; and
    a fluid conduit component fluidly isolated from the inner side of the aircraft skeleton component and running on the outer side of the aircraft skeleton component and fluidically connecting the two spatial portions.

2. The aircraft structural component according to claim 1, wherein the fluid conduit component is a flexible hose or a rigid conduit.

3. The aircraft structural component according to claim 1, wherein the aircraft skeleton component is a stringer or a frame.

4. The aircraft structural component according to claim 1, wherein the fluid conduit component is fastened to the aircraft skeleton component.

5. The aircraft structural component according to claim 4, wherein the fluid conduit component is fastened to the outer side of the aircraft skeleton component.

6. The aircraft structural component according to claim 1, further comprising:
    a wall or hull of an aircraft tank;
    wherein the aircraft skeleton component is arranged on and fastened to an inner side of the wall or hull.

7. The aircraft structural component according to claim 6, wherein the wall or hull delimits a tank space of the aircraft tank.

8. The aircraft structural component according to claim 1, wherein the fluid conduit component comprises a semipermeable membrane or a valve at least one end, wherein the membrane or the valve makes it possible for air to flow through and prevents a liquid from flowing through into the fluid conduit component.

9. The aircraft structural component according to claim 1, wherein the fluid conduit component also comprises a safety valve which is configured to let liquids out of the fluid conduit component and is also configured to prevent a liquid from penetrating.

10. The aircraft structural component according to claim 1, wherein the aircraft skeleton component is manufactured from carbon fiber-reinforced plastic.

11. An aircraft wing with an aircraft structural component according to claim 1.

12. An aircraft with an aircraft structural component according to claim 1.

13. An aircraft with an aircraft wing according to claim 11.

14. The aircraft according to claim 12, further comprising:
a wall or hull of an aircraft tank;
wherein the aircraft skeleton component is arranged on and fastened to an inner side of the wall or hull, and
wherein the wall or hull of the aircraft tank is a part of an outer skin of the aircraft.

* * * * *